United States Patent [19]

Martin

[11] Patent Number: 4,864,918
[45] Date of Patent: Sep. 12, 1989

[54] THERMOPLASTIC DIAPHRAGM

[75] Inventor: Dieter Martin, Lakewood, Colo.

[73] Assignee: The Gates Rubber Company, Denver, Colo.

[21] Appl. No.: 927,890

[22] Filed: Nov. 7, 1986

[51] Int. Cl.[4] .......................... F01B 19/00; F16J 3/00
[52] U.S. Cl. ........................... 92/103 SD; 92/103 R; 92/98 R
[58] Field of Search .............. 92/103 SD, 103 A, 102, 92/101, 100, 99, 98 D, 98 R

[56] References Cited

U.S. PATENT DOCUMENTS

| | | | |
|---|---|---|---|
| 2,744,543 | 5/1956 | Brady | 92/98 R |
| 3,933,773 | 1/1976 | Foerster | 526/87 |
| 4,086,036 | 4/1925 | Hagen et al. | 92/99 |
| 4,671,432 | 6/1987 | Benecke et al. | 92/98 D |

FOREIGN PATENT DOCUMENTS 7536887 10/1976 Fed. Rep. of Germany .
2418352 9/1979 France .
1044551 10/1966 United Kingdom .

Primary Examiner—Robert E. Garrett
Assistant Examiner—Thomas Denion
Attorney, Agent, or Firm—C. H. Castleman, Jr.; H. W. Oberg, Jr.

[57] ABSTRACT

A diaphragm for pumps or the like of a dish-shaped body of nonreinforced thermoplastic elastomer having a curvilinear flexure sidewall portion of substantially less thickness than the central and flange portions to which it connects.

7 Claims, 1 Drawing Sheet

THERMOPLASTIC DIAPHRAGM

BACKGROUND OF THE INVENTION

This invention relates to diaphragms for such uses as air-operated or mechanically operated diaphragm pumps, brake actuators or other diaphragm-operated devices in which a central plate or plates is connected to or makes contact with the central portion of the diaphragm.

Pump diaphragms have traditionally been made of fabric reinforced rubber, typically having a relatively thick and constant wall thickness of usually about 0.125 inches to about 0.320 inches. The wall thickness is usually in the range from about 1.2% to about 3% of the outside diameter of the flexure portion of the diaphragm. An example of the conventional rubber diaphragm is shown is U.S. Pat. No. 3,911.796 to Hull et al. Diaphragms of this type are generally dish shaped, having a top planar portion which undergoes the greatest amount of abrasion and wear, an outer flange portion which may be dovetailed or beaded for retention in an associated pump housing, and an innerconnecting flexure sidewall portion. Fabric reinforcement must be embedded in the body of these diaphragms to achieve adequate flex fatigue life, which drives up the cost. Rubber diaphragms also require use of a relatively large quantity of material because a thick wall is needed for abrasion resistance and to meet flexing requirements. In certain applications the lack of chemical resistance presents problems as well.

To a limited extent, plastic materials with relatively stiff central portions and thinner, more flexible sidewall portions have been used in some diaphragm applications, for instance, as disclosed in U.S. Pat. No. 3,011,758 to McFarland, Jr. Thermoplastic polyurethane diaphragms have also been used as pump diaphragms. These polyurethane diaphragms have been constructed with a generally curvilinear flexure sidewall incorporating concentric ribs, terminating in an outer beaded flange and radially inward bead for mounting to a split piston plate. The sidewall thickness of these polyurethane diaphragms has been from 0.090 inches up to 0.250 inches. Alternately, the sidewall thickness of these polyurethane diaphragms has been from 1% to 3% of the outside diameter of the flexure portion of the diaphragm.

Two primary modes of failure for pump diaphragms, particularly of the thermoplastic type, are abrasion failure due to the diaphragm contacting the piston plates and the pump housing areas immediately adjacent to where the diaphragm is clamped to the housing, and fatigue failure due to repeated flexing. Abrasion life is maximized normally by increasing material thickness, while flex life is normally maximized by decreasing material thickness. These competing requirements present a problem which is accentuated with nonreinforced, thermoplastic diaphragms.

It is a primary object of this invention to provide a diaphragm made of a nonreinforced thermoplastic material which has an acceptably long flex life and superior abrasion resistance.

It is another object to produce such a diaphragm by proper design of wall thickness and contour to minimize use of material and cost without sacrificing the life of the diaphragm.

In addition to the foregoing statement of the prior art, the following patents are considered relevant to this invention: U.S. Pat. Nos. 3,680,981 to Wagner; 2,904,068 to St. Clair; and 4,238,992 to Tuck, Jr.

SUMMARY OF THE INVENTION

Briefly described, in one aspect the diaphragm of the invention has a generally dish shaped body formed from a thermoplastic elastomer, which in turn is comprised of a marginal flange, adapted to be fixedly held in an associated housing, a generally planar abrasion resistant and flexible central portion, mountable for reciprocal movement within the housing, and an annular flexure portion of curvilinear cross-sectional shape, attached to and connecting the flange and the central portion, and being downwardly inclined relative to the plane of the central portion, and having a wall whose average thickness is substantially less than the average wall thickness of the planar portion and preferably substantially less than the wall thickness of the flange as well.

In another aspect, the length of the flexure portion of the aforementioned diaphragm as measured radially along the curvilinear surface from the flange to the central portion is from about 3% to about 8% greater than the straight line length from the flange to the central portion.

BRIEF DESCRIPTION OF THE DRAWINGS

The invention in its preferred embodiments will be described in conjunction with the attached drawings, in which like numerals designate like parts, and in which.

PREFERRED EMBODIMENTS OF THE INVENTION

A pump diaphragm will be described; however, it will be appreciated that the diaphragm of the invention may be used in various other applications.

Figure 1:
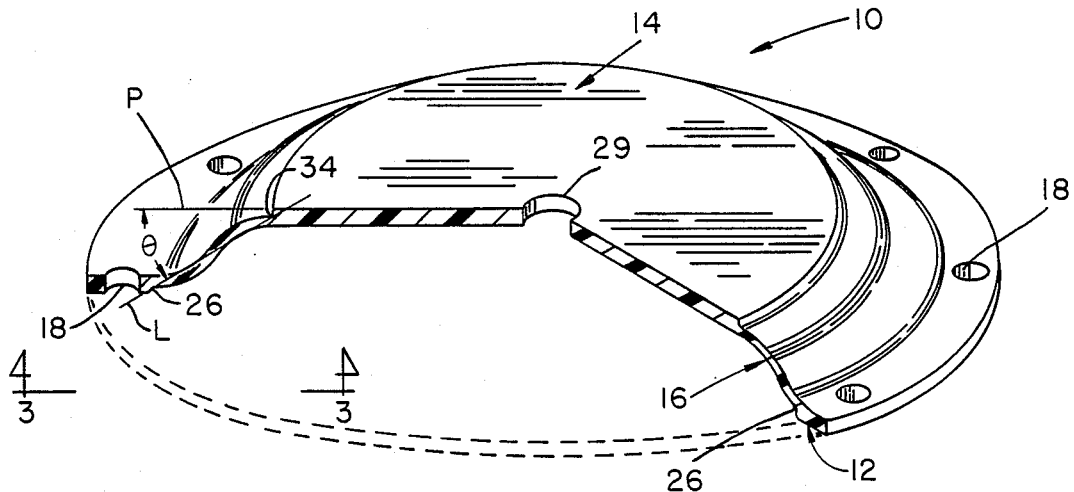
FIG. 1 is a perspective, partially cut away view of the preferred diaphragm of the invention.

Referring to FIG. 1, a generally concave, dish shaped diaphragm is shown at 10 and comprises a marginal flange 12, a central generally planar portion 14, and an interconnecting annular flexure sidewall portion 16. The diaphragm body is formed as a unitary molding from a thermoplastic elastomer which is preferably free of any embedded textile reinforcing material. Because of the nature of the thermoplastic elastomer material used for the body of the diaphragm, no separate reinforcing material is required, and minimum wall thicknesses are utilized without sacrificing flexing properties and abrasion resistance.

Suitable thermoplastic elastomers which may be employed include Santoprene (registered trademark of Monsanto Co.), formed of a blend of EPDM rubber and polypropylene, various thermoplastic urethanes including polyether and polyester based polyurethanes, and Hytrel (registered trademark of du Pont Co.), a polyester elastomer. A suitable listing of usable thermoplastic elastomers is given in "Elastomerics," Oct. 1986, v. 118, no. 10. pp. 13–19. Although the polyurethanes yield superior abrasion resistance and have excellent flexing properties, Santoprene ® thermoplastic elastomer is preferred for many applications because of lower cost, and long flex life when employing the preferred wall design in accordance with this invention. The thermoplastic elastomers of the invention provide advantages of both thermoplastics and elastomers separately.

Figure 2:
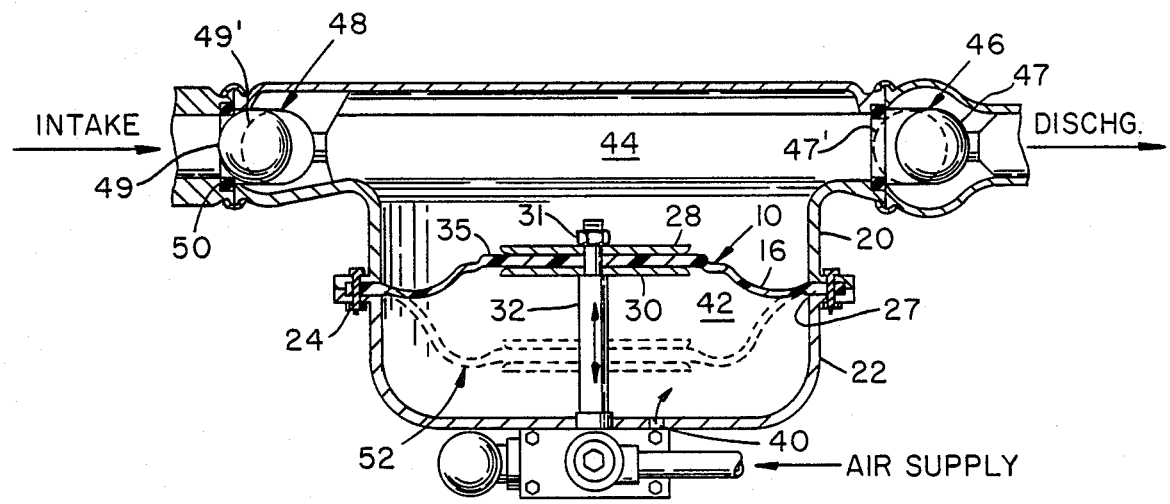
FIG. 2 is a vertical sectional view of portions of an air-operated pump employing the diaphragm of the invention.

Flange 12 is provided with means for retaining the diaphragm in an associated pump housing. For instance, flange 12 can be formed with an enlarged bead, or a dovetailed portion as shown in U.S. Pat. No. 3,911,796 to Hull et al. or, as shown, be provided with a plurality of holes 18 for receipt of fastening members. As shown in FIG. 2, diaphragm 10 is clamped between housing sections 20 and 22 with bolt and nut fastening members 24, spaced circumferentially about the housing.

That portion 27 of the flange 12 which immediately adjoins the juncture 26 between the flange and the flexure sidewall 16 is thickened or enlarged relative to the sidewall as this is an area subject to considerable abrasion when the diaphragm is flexed, causing contact with the inner surface of the pump housing sections 20 and 22.

Central portion 14 of the diaphragm will be flexible and resilient and has a generally planar shape to adapt to generally flat piston plates 28 and 30 sandwiching the central portion of the diaphragm, as shown in FIG. 2. The central portion is provided with aperture 29 to receive fastening member 31 to secure the assembly of the central portion and adjacent piston plates. The piston plates 28, 30 are in turn attached to shaft 32 which is mounted for reciprocal movement within the housing.

Figure 3:
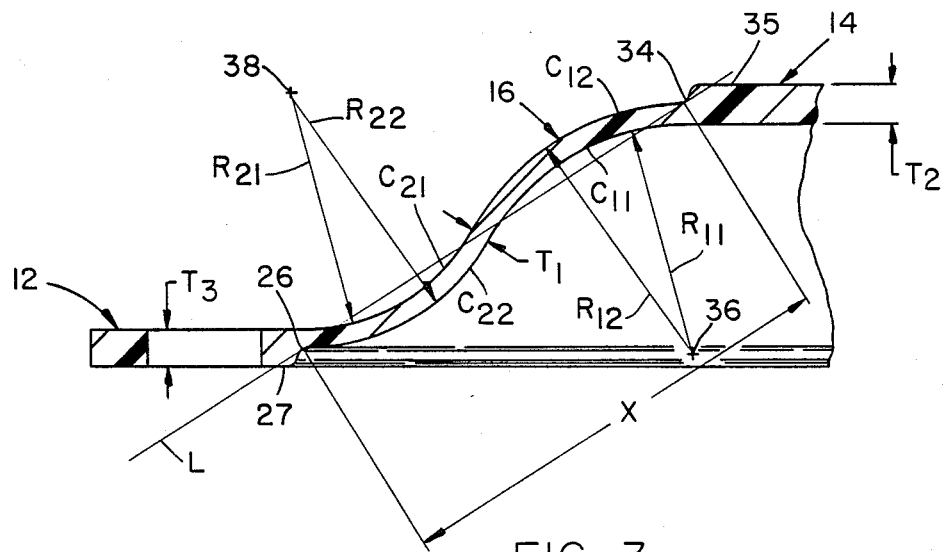
FIG. 3 is an enlarged view of the wall of the diaphragm of FIG. 1, viewed along 3—3 thereof.

As shown in FIGS. 2 and 3, central portion 14 of the diaphragm is also provided, radially inwardly from juncture 34 with the flexure sidewall, with a thickened, abrasion resistant portion 35 where the diaphragm would normally contact the surface of piston plates 28, 30 in operation. Preferably the entire central portion of the diaphragm has the same uniform increased thickness.

Annular flexure sidewall portion 16 has a curvilinear cross-sectional shape as exemplified by FIG. 3. Preferably, the curvilinear sidewall is formed of a compound curve, shown composed of curves $C_{22}$ and $C_{11}$ on the concave side of the flexure sidewall, and curves $C_{21}$ and $C_{12}$ on the outside or convex side of the flexure sidewall 16. The respective segments of the sidewall are defined by arcs generated from center points lying on opposite sides of the sidewall. Thus, accordingly, curves $C_{11}$ and $C_{12}$ are respectively defined by radii $R_{11}$ and $R_{12}$ and center point 36. Similarly, curves $C_{21}$ and $C_{22}$ are defined by center point 38 and radii $R_{21}$ and $R_{22}$, respectively. For optimum flexing, it is preferred that curves $C_{22}$ and $C_{11}$ join smoothly without any substantial straight portion innerconnecting the two curves (similarly, that interconnecting curves $C_{21}$ and $C_{12}$ join smoothly). However, some designs, because of housing dimensions and stroke length, will require a straight portion. It is important that the radii are as large as possible and still provide the 3% to 8% additional flexure wall length.

The length of the flexure portion measured radially along the curvilinear surface (e.g., along the compound curve $C_{22}$ and $C_{11}$) from the flange 12 to the central portion 14 is from about 3% to about 8% greater than the straight line length X along line L joining the flange and central portion from juncture 26 to juncture 34. It has been found that if this length of the flexure portion is less than about 3% greater than the straight line distance X, flex fatigue life is reduced since there tends to be two separate hinge points created when the flexure sidewall is subject to flexing in operation. When the length of the flexure portion is greater than about 8% of the straight line length X, it has been found that there is too much sidewall material and the result is a folding of the material back on itself in operation (e.g., of the diaphragm pump of FIG. 2), leading to premature flex fatigue failure. On the other hand, when the length of the flexure portion is within the range from about 3% to about 8%, there is a rolling action of the sidewall during use, much like a moving hinge, resulting in increased flex life.

Flexure portion 16 is also generally downwardly inclined (line L) relative to the plane P of the central portion, as shown in FIG. 1. Thus, preferably the inclination angle $\theta$ of line L corresponding to the general inclination of sidewall portion 16 is from about 5° to about 60°, more preferably from about 25° to about 50° relative to plane P. It is believed that provision of this downward inclination in the flexure sidewall relative to the central planar portion results in a diaphragm having reduced stress in operation.

It is critical that the average thickness $T_1$ of the flexure sidewall portion is substantially less than the average wall thickness $T_2$ of the central portion of the diaphragm, and also preferable that the thickness $T_1$ of the sidewall is substantially less than thickness $T_3$ of the flange portion. This relative dimensioning of the thicknesses of the various components of the diaphragm results in optimum flexing life and simultaneous optimum abrasion resistance. The relatively thinner flexing sidewall section decreases the stresses imposed on the diaphragm when flexing without compromising the abrasion resistance, particularly of portions 27 and 35 of the flange and central portions. The aforementioned features are obtained when the absolute thickness $T_1$ is nominally about 0.060 inches in the most preferred embodiment, or more broadly from about 0.040 to about 0.090 inches, alternately, $T_1$ is between about 0.5% and 1% of the outside diameter of the flexure portion, preferably between about 0.55% and 0.90%. The outside diameter is substantially defined at point 26 in the drawings. Although the relative thickness of the sidewall and central and flange portions will vary depending on the flex fatigue, tensile strength and abrasion properties of the material used, as well as the diaphragm size (diameter), in general the wall of the central portion (and preferably also the flange portion) will preferably have a thickness from about 125% to about 300% of the thickness of the flexure portion, more preferably from about 130% to about 200%.

In operation of the diaphragm of the invention, referring to FIG. 2, air supply pressure is directed into chamber 42 via orifice 40 to act against the backside of diaphragm 10. During the discharge stroke (not quite completed), as shown, diaphragm 10 moves upwardly causing fluid, such as an abrasive slurry of solids and liquids present in chamber 44, to be discharged around ball 47 through ball check valve assembly 46 in known manner. During discharge ball 49 of ball check valve assembly 48 will be sealed against O-ring 50. Similarly, during the intake stroke diaphragm 10 and piston plates 28, 30 and shaft assembly 32 will be positioned as shown in phantom at 52 and the resultant suction created will move ball 49 to position 49' shown in phantom and ball 47 will move into sealing engagement at position 47' since the backside pressure in the discharge line will exceed the pressure in chamber 44. Upon completion of the intake stroke, shaft 32 reverses direction and the discharge stroke commences, with the cycle continuing as desired.

As previously discussed, flexure portion 16 of the diaphragm undergoes a type of rolling action during cycling of the pump, with minimum flexural stress, while simultaneously high abrasion areas 27, 35 are provided with sufficient thickness adjoining constricted junctures 26, 34 to allow for maximum abrasion resistance.

While certain representative embodiments and details have been shown for the purpose of illustrating the diaphragm of the invention, it will be apparent to those skilled in this art that various changes and modifications may be made therein without departing from the spirit or scope of the invention.

What is claimed is:

1. A generally dish shaped diaphragm having a body formed from a thermoplastic elastomer, comprising in its unstressed condition:
    a marginal flange portion, to fixedly retained in an associated housing;
    a generally planar abrasion resistant and flexible central portion, mountable for reciprocal movement within the housing; and
    an annular flexure portion of curvilinear cross-sectional shape, attached to and connecting the flange and the central portion, the entire flexure portion being downwardly inclined relative to the plane of the central portion, and having a wall whose average thickness is substantially less than the average thickness of the central portion;
    the diaphragm having a ratio of the thickness of the flexure portion to its outside diameter of from about 0.5% to about 1.0%.

2. The diaphragm of claim 1 wherein the wall of the central portion has a thickness from about 125% to about 300% of the thickness of the flexure portion.

3. The diaphragm of claim 1 in which the diaphragm is free of embedded textile reinforcing material.

4. A diaphragm having a body formed from a thermoplastic elastomer, the body being free from fabric reinforcement, comprising in its unstressed condition:
    a marginal flange, to be retained in an associated housing;
    an abrasion resistant and flexible central portion, mountable for reciprocal movement within the housing;
    an annular flexure portion of curvilinear cross-sectional shape whose curvilinear portion is formed solely of two curved segments, the flexure portion being attached to and connecting the flange and the central portion, the entire flexure portion being downwardly inclined relative to the central portion, and having a wall whose average thickness is substantially less than the average wall thickness of the central portion;
    said flexure portion having a length measured radially along its curvilinear surface from the flange to the central portion which is from about 3% to about 8% greater than the straight line length from the flange to the central portion; and
    said diaphragm having a ratio of the thickness of the flexure portion to its outside diameter of from about 0.5% to about 1.0%.

5. A generally dish shaped diaphragm having a body formed from a thermoplastic elastomer, comprising in its unstressed condition:
    a marginal flange portion, to be retained in an associated housing;
    an abrasion resistant and flexible central portion, mountable for reciprocal movement within the housing; and
    an annular flexure portion of curvilinear cross-sectional shape, attached to and connecting the flange and the central portion, at least a portion of the flexure portion being downwardly inclined relative to the plane of the central portion, and having a wall whose average thickness is substantially less than the average thickness of the central portion;
    the diaphragm having a ratio of the thickness of the flexure portion to its outside diameter of from about 0.5% to about 1.0%.

6. The diaphragm of claim 5 wherein the wall of the central portion has a thickness from about 125% to about 300% of the thickness of the flexure portion.

7. The diaphragm of claim 5 in which the diaphragm is free of embedded textile reinforcing material.

* * * * *